March 24, 1970     A. VALO     3,502,191
DEVICE FOR MOVING LOGS AND SIMILAR GOODS
Filed Nov. 7, 1967     2 Sheets-Sheet 1

March 24, 1970     A. VALO     3,502,191

DEVICE FOR MOVING LOGS AND SIMILAR GOODS

Filed Nov. 7, 1967     2 Sheets-Sheet 2

United States Patent Office 3,502,191
Patented Mar. 24, 1970

3,502,191
DEVICE FOR MOVING LOGS AND SIMILAR GOODS
Antti Valo, Lohja, Finland
Filed Nov. 7, 1967, Ser. No. 681,241
Claims priority, application Finland, Nov. 8, 1966,
2,932/66; July 19, 1967, 1,991/67
Int. Cl. B65g 47/00
U.S. Cl. 198—25  4 Claims

ABSTRACT OF THE DISCLOSURE

A device for the transferring of longitudinal objects such as logs and similar goods from a transversal conveyor to a longitudinal conveyor, and comprising horizontally displaced rotatable axis parallel to the logs in the first mentioned conveyor with at least two discs on each axis, said discs having peripheral notches dimensioned according to the logs to be transferred whereby the primary axis is arranged at the exhaust end of the transversal conveyor and the secondary axis adjacent the longitudinal conveyor and so that in one position of the rotating discs the primary discs receive logs escaping from the transversal conveyor, in another position the notches in the primary and secondary discs together form apertures of the form of a transversal section of a groove during which moment the logs are transmitted from the primary discs to the secondary discs, and in a third position the notches of the secondary discs deliver their log to the longitudinal conveyor, the arrangement being characterized by the combination of the features that the peripheries of the discs on the two parallel axes overlap each other, that the notches in the secondary discs are dimensioned according to the smallest logs to be handled so that when a ridge is created by the notch walls when the discs part from their groove position only one log might be remitted to the secondary disc, the transfer of the log being secured by a pushing element, mechanically operated to push the logs from the primary to the secondary disc notches.

---

The present invention relates to a device for moving longitudinal objects such as logs and similar goods from one conveyor where the logs are moved transversely to their length, to an other conveyor, where the logs are moved one after the other in their longitudinal direction.

The invention relates particularly to that kind of transporting device which comprises discs mounted on rotating parallel axes and having notches in their periphery arranged to co-operate together as well as with the units delivering and receiving the transferred logs. In one predetermined position the notches in the discs on one axis are arranged to receive logs from the log delivering unit. In an other predetermined position the notches form a gap corresponding to the transverse section of a groove. In this position the logs are passed from the notches in a first series of the discs to the notches in a following series of discs. In a final third position, the logs are transferred from the notches of the second disc series to a log receiving unit.

One known arrangement of this kind is shown in the Swedish Patent 58,859. The logs are magazined in a container having an inclined bottom along which the logs due to their gravity move down to an exhaust opening of the magazine. There is a series of parallel rotatable axes arranged side by side on a horizontal frame which axes have rollers or discs with peripheral notches which when the axes rotate are arranged to catch logs escaping from the magazine exhaust, thereafter to pass the logs from one set of rollers or discs to the following and at the other end of the axes series to deliver the logs into a special loghandling machine.

The transferring device according to said Swedish patent as well as other known devices belonging to the known art have the drawback that they cannot always guarantee the deliverance of one log at the time to the log receiving unit. Consequently they are not useful for passing logs from a magazine or a conveyor where the logs are moving transversely to their length to another conveyor where the logs are intended to be moved one after the other in their longitudinal direction. Conveyors of the last mentioned type are used in debarking machines of the rotor type where the logs are moved in their longitudinal direction through the rotor of the debarker.

The present invention is an improvement of the known type of apparatus and is particularly useful for the feeding of logs from a log magazine onto a longitudinal log conveyor passing the logs in their longitudinal direction into a rotor debarker.

The device according to the invention comprises preferably two axes displaced relatively to each other in horizontal direction, these axes, for instance, being located side by side on a common substantially horizontal support frame and in parallel to the logs in a log magazine or on a first conveyor transporting the logs transversely to their longitudinal direction. Each axis has at least two discs with peripheral notches dimensioned as to be able to catch and hold at least one log. The first or primary axis is disposed adjacent the exhaust of the first conveyor and is arranged with a certain position of their discs to catch logs escaping from said first conveyor. The other or secondary axis is situated adjacent the second conveyor and its disc notches are adapted in a certain position to deliver one log to said second conveyor. In an intermediate position of the rotating discs their notches will together form an aperture corresponding to the cross section of a groove. In this position the logs are passed over from the primary discs to the secondary discs.

The device according to the invention is characterized by a combination of different co-operating features namely:

(a) The discs on the two parallel axes are dimensioned as to overlap each other seen in a direction perpendicularly against the disc surfaces.

(b) The notches of the discs are so dimensioned that they, on account of the above indicated overlapping when the discs by their rotation depart from that position in which their notches together form a groove, will create a ridge parting the logs within the grooves retaining one part in the primary discs and transferring the other to the secondary discs.

(c) The notches in the secondary discs are dimensioned according to the theoretically thinnest handled logs so that they are only able to receive and catch a single log at the time.

(d) The discs are arranged to co-operate with a mechanically operated pushing element adapted to push the logs within the grooves formed by the notches in the two disc series in the direction from the notches in the primary discs to the notches in the secondary discs, so that one log will always be transferred to and caught by said secondary discs.

According to one modified embodiment of the invention the secondary axis might be arranged either to be turned alternatively to and fro or to rotate continuously in the same direction while the primary axis always must be turned alternatingly to and fro through a certain predetermined angle.

According to another suitable embodiment the discs on the secondary axis are arranged to rotate faster than the primary discs.

The invention will be explained in greater detail with reference to the accompanying drawing in which.

Figure 1:
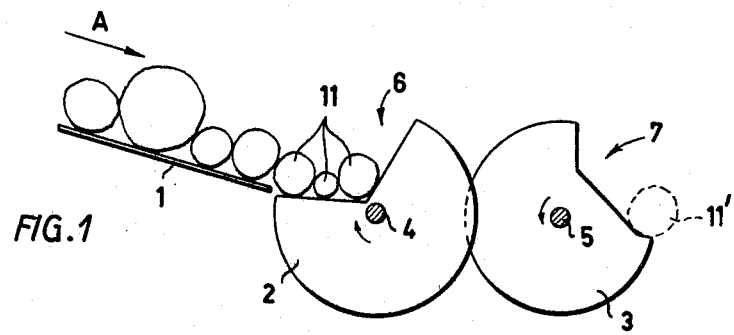
FIGURE 1 shows an end view of an embodiment of the device, when the discs are in one end position.
Figure 2:
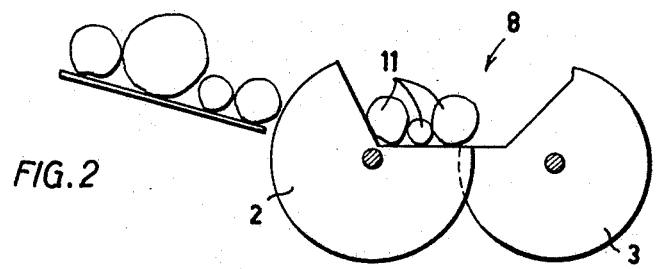
FIGURE 2 shows the discs in an intermediate position.

A first conveyor transporting the logs in transverse direction is indicated in FIG. 1 by the reference 1, the logs being moved either by gravity or some mechanical arrangement in the direction of the arrow A. The transfer device comprises two axes 4, 5 with discs 2 and 3 with overlapping peripheries. In the illustrated embodiment the axes 4, 5 rotate in coordinated manner to and fro always in opposite directions. The end positions of the rotary motions are shown in FIGS. 1 and 2. The motion of the discs can be produced in various ways, suitable mechanically. One axis may be driven by means of a crank shaft and the other by means of a gearing from the first axis.

The peripheries of both discs are provided with notches 6, 7. In the position show in FIG. 2, the notches together form a cross section corresponding to the form of a groove 8.

Figure 3:
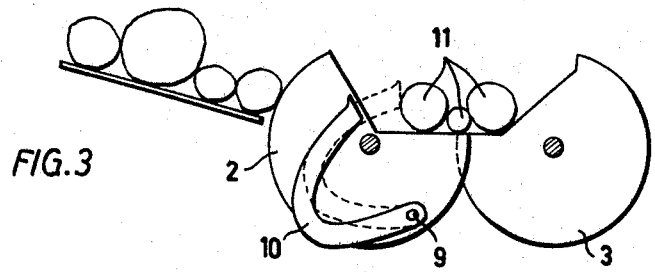
FIGURE 3 shows the device in the position according to FIG. 2, but combined with a pushing element, which cooperates with the discs.

The disc 2 is combined with an arm element 10, which is pivotedly mounted at 9, and arranged to be mechanically turned between the positions indicated by solid and dotted lines in FIG. 3.

The device according to the invention operates in the following manner:

When the disc 2 is in the starting position of FIG. 1, some logs 11 fall from the plane 1 into the notch 6 of the primary disc 2. From this starting position the discs are turned in opposite directions as indicated by the arrows until they reach the position of FIG. 2, where the notches in the discs 2 and 3 together correspond to the cross section of groove 8.

Figure 4:
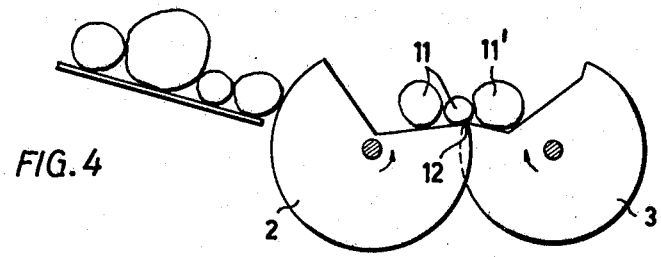
FIGURE 4 shows the discs leaving the position according to FIG. 2.
Figure 5:
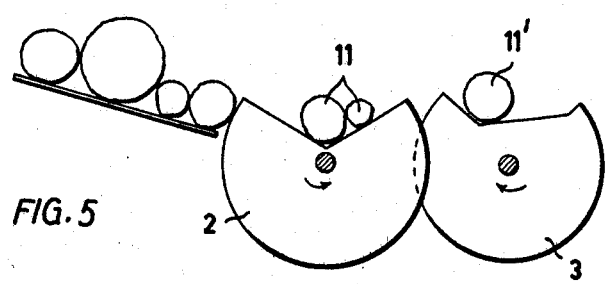
FIGURE 5 shows the discs in rotation in the opposite direction relative to FIGS. 1 and 2.

When the discs are turned from this position back into the starting position of FIG. 1, the logs will be moved so that the foremost log 11', FIG. 4, is transferred to the notch 7 in the secondary disc 3. The movement is guaranteed by an arm 10 arranged to be operated by the disc 2 and push the logs forward against the notch within the secondary disc 3, see FIG. 3.

When the discs start to rotate back as indicated by the arrows in FIG. 4, the bottom of the groove is broken upwards forming a ridge 12. Thus, the log 11' will be maintained in the disc 3 while the other logs will be kept in the disc 2. The disc 3 transfers the log 11' to the next conveyor 13 and simultaneously the primary disc will receive the next set of logs from the plane 1.

Figure 6:
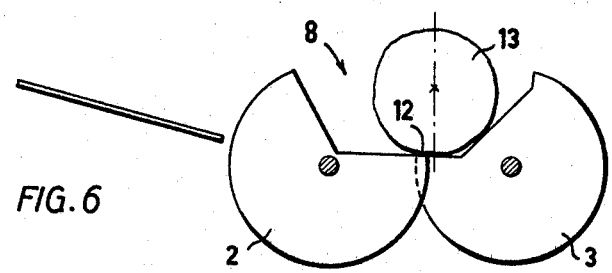
FIGURE 6 shows the discs in a position similar to that of FIG. 3.

FIGURE 6 shows an example in which the disc 2 has transferred a log 14 of the largest possible dimension to the disc 3. The pushing arm 10 has pushed it to the notch 7 of the disc 3. The center of gravity of the log lies within the notch of the disc 3 and will consequently follow the rotation of the disc 3.

Figure 7:
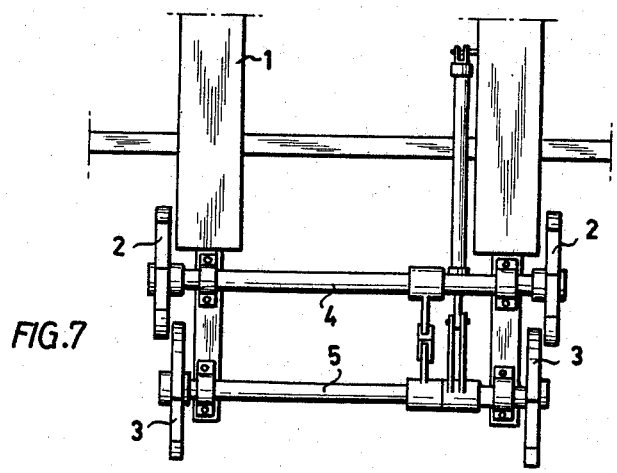
FIGURE 7 shows the conveyor unit seen from above.

FIGURE 7 shows an unit comprising two pairs of discs seen from above.

Figure 8:
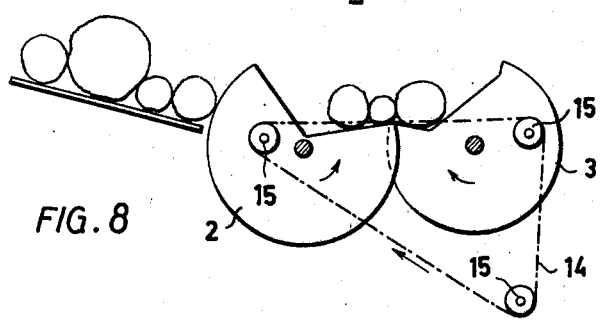
FIGURE 8 shows another embodiment of the pushing element.

According to FIG. 8 the pushing arm element 10 is substituted by a chain 14 running over wheels 15 and driven by the same mechanism which operates the discs 2 and 3. The chain device is arranged to act upon the logs forcing them from the disc 2 to the disc 3.

What is claimed is:

1. Apparatus for transferring elongated objects of a given range of diameters from a transverse to a longitudinal conveyor, said apparatus comprising at least two discs with over-lapping peripheries rotatable on horizontally spaced axes parallel to each other and to elongated objects in the transverse conveyor, the axis of one of said discs being positioned adjacent the transverse conveyor, the axis of the other disc being positioned adjacent the longitudinal conveyor, the discs being provided with peripheral notches for receiving and discharging said elongated objects, drive means to rotate the discs so that the notch in said one disc is positioned to receive elongated objects from the transverse conveyor, and so that said other disc is positioned to discharge elongated objects to said longitudinal conveyor and further so that there is an intermediate position of the discs whereat the notches open into each other and cooperatively form a groove due to which elongated objects can be transferred from said one disc to said other disc and so that there is a further intermediate position in which a dividing ridge is formed in the groove, the notch in said other groove being so arranged and dimensioned according to the smallest diameter in said range that when said ridge appears in the groove only one elongated object can be transferred to the notch in said other disc, and pusher means to urge the elongated objects from the notch in said one disc to the notch in said other disc.

2. Apparatus as claimed in claim 1 wherein said drive means includes means to rotate the discs to and fro simultaneously in opposite directions.

3. Apparatus as claimed in claim 1 wherein said pusher means includes a displaceable arm adjacent said groove.

4. Apparatus as claimed in claim 1 wherein said pusher means includes a displaceable chain adjacent said groove.

References Cited

UNITED STATES PATENTS 3,184,034   5/1965   Stuller _____ 198—29

EDWARD A. SROKA, Primary Examiner

U.S. Cl. X.R.

143—92; 198—26